United States Patent [19]

Layer

[11] E Patent Number: Re. 32,631

[45] Reissued Date of Patent: Mar. 29, 1988

[54] MEASUREMENT CIRCUIT FOR LOAD CELL

[75] Inventor: Howard P. Layer, Derwood, Md.

[73] Assignees: Frazier Precision Instrument Company, Inc., Gaithersburg; Holometrics, Inc., Derwood, both of Md.

[21] Appl. No.: 884,728

[22] Filed: Jul. 10, 1986

Related U.S. Patent Documents

Reissue of:

[64] Patent No.: 4,541,496
Issued: Sep. 17, 1985
Appl. No.: 588,219
Filed: Mar. 12, 1984

[51] Int. Cl.[4] ..... G01G 3/14; G01B 7/16; G01D 3/04

[52] U.S. Cl. ..... 177/211; 73/766; 73/862.63

[58] Field of Search ..... 177/211; 73/766, 862.63

[56] References Cited

U.S. PATENT DOCUMENTS

| | | | |
|---|---|---|---|
| 2,592,009 | 4/1952 | Clement et al. | 177/211 X |
| 3,046,411 | 7/1962 | Steiner | 177/211 X |
| 3,234,787 | 2/1966 | Ruge | 73/862.67 |
| 3,470,738 | 10/1969 | Laimins | 73/862.63 X |
| 4,173,148 | 11/1979 | Yamada et al. | 73/766 |
| 4,267,724 | 5/1981 | Spoor | 73/862.65 |

*Primary Examiner*—George H. Miller, Jr.
*Attorney, Agent, or Firm*—Brady, O'Boyle & Gates

[57] ABSTRACT

The strain gauge bridge circuit located in [the] *a* load cell [of a load cell mass comparator] is modified to provide temperature stability by coupling a remotely located temperature compensating circuit between the two normally connected output ends of strain gauges in adjacent arms of the bridge. The compensating circuit is comprised of a pair of series connected low noise, drift-free precision resistors of relatively low resistance value compared to the resistance of the strain gauges. The precision resistors are shunted by relatively high valued potentiometers which operate to balance the bridge. One potentiometer additionally includes a series connected high value precision resistor for providing fine balance while the other potentiometer is used for coarse balance.

27 Claims, 3 Drawing Figures

MEASUREMENT CIRCUIT FOR LOAD CELL

Matter enclosed in heavy brackets [ ] appears in the original patent but forms no part of this reissue specification; matter printed in italics indicates the additions made by reissue.

CROSS REFERENCE TO RELATED APPLICATION

This application is related to U.S. Ser. No. 06/587,532, entitled, "Load Cell Mass Comparator", filed in the names of Thomas F. Scrivener and Randall M. Schoonover, on Mar. 8, 1984, [and] is assigned to the assignee of this invention[.], *and now U.S. Pat. No. 4,523,653.*

BACKGROUND OF THE INVENTION

To overcome the disadvantages experienced in the calibration of mass standards employing conventional mechanical balances, it has been proposed to use a strain gauge load cell which produces an electric signal in proportion to the force exerted on the cell. Typically, a plurality of strain gauges are located in the cell and are internally connected in the form of a bridge circuit, the output of which is connected to electronic measuring and recording equipment. Where the electronic measuring circuit is comprised of a low noise, high stability electronic circuit, wide fluctuations at the output of the bridge circuit due to temperature drift is not only undesirable, but intolerable where difference measurements are made between a standard weight and a test weight.

Accordingly, the present invention is directed to [an] *a* [improved] *temperature stabilized* bridge circuit formed by the strain gauges located in [the] *a* load cell [of] *such as, but not limited to* a load cell mass comparator. The bridge circuit is modified for use as a difference transducer by coupling a temperature compensating circuit between ends of strain gauges in adjacent arms of the bridge. The compensating circuit is located remotely from the load cell containing the strain gauges and is comprised of a pair of relatively low valued series connected low noise, drift free precision resistors, which are respectively shunted by relatively high valued resistive potentiometers which are used for balancing the bridge. One potentiometer additionally includes a series connected relatively high valued low noise, drift free precision resistor for providing a means for providing fine balance of the bridge, while the other potentiometer is used for providing coarse balance.

DESCRIPTION OF THE PREFERRED EMBODIMENT

Figure 1:
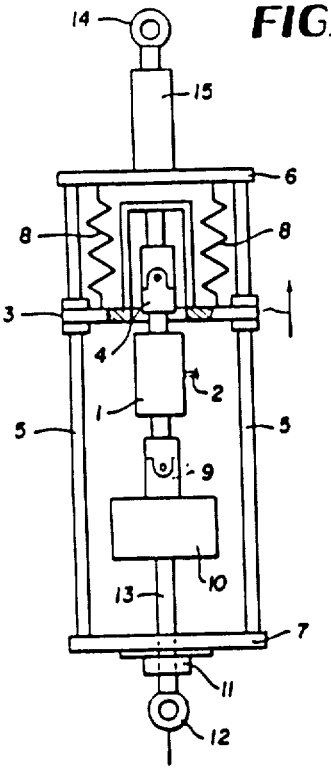
FIG. 1 is a mechanical schematic diagram of a load cell mass comparator [utilized in connection with the present invention]

Referring now to the drawings and more particularly to FIG. 1, there is shown a load cell mass comparator of the type shown and described in the above referenced [related application, U.S. Ser. No. 587,532 filed Mar. 8, 1984, now] U.S. Pat. No. 4,523,653. As shown in FIG. 1, reference numeral 1 denotes a conventional load cell which may be, for example, a type manufactured by Revere Corporation of America, and which includes a plurality of strain gauges, not shown, internally wired together to form a Wheatstone bridge such as shown in FIG. 2 and which additionally includes an output cable 2 for being coupled to an externally located supply and measuring circuit, not shown.

The load cell 1 is connected at its upper end to a floating plate 3 through a self aligning coupling such as a universal joint assembly 4. The floating plate 3 is slidably mounted on a plurality of guide rods 5 extending between a fixed upper plate 6 and a fixed lower plate 7. A spring and shock absorber assembly shown schematically by reference numeral 8 is mounted between the floating plate 3 and the upper fixed plate 6. The lower end of the load cell 1 is connected to the mass to be calibrated, not shown, through a second self-aligning coupling 9, a thrust bearing 10, and a load stop bearing 11. The mass to be calibrated is connected to an eyelet 12 provided on the lower end of a rod 13 connected to the thrust bearing 10 and the load stop bearing 11. Another eyelet 14 is secured to the upper fixed plate 6 through a hydraulic cylinder 15 so that the entire assembly may be suspended from a suitable support and the comparator can be loaded and unloaded by actuation of the hydraulic cylinder.

As force is applied to the load cell 1, minute deflections are imposed on the internally located strain gauges resulting in changes in the cross section thereof. As is well known, the strain gauges are electrical components whose resistance changes upon the application of external force. Accordingly, the strain gauges in the load cell 1 are represented as resistors $R_1$, $R_2$, $R_3$and $R_4$ in both FIGS. 2 and 3 and are connected in a bridge circuit configuration. With a fixed excitation voltage applied across the bridge, for example, at terminals 16 and 17 (FIG. 2) and which are connected to a first pair of mutually opposing circuit junctions 18 and 19, the bridge becomes unbalanced and an output voltage is generated across a second pair of mutually opposing junctions 20 and 21. The output voltage is then coupled to the output terminals 22 and 23 and is proportional to the applied load, which when coupled to the measuring circuit, not shown, can be appropriately amplified, displayed, printed or otherwise interfaced to a fully automated control system.

Figure 2:
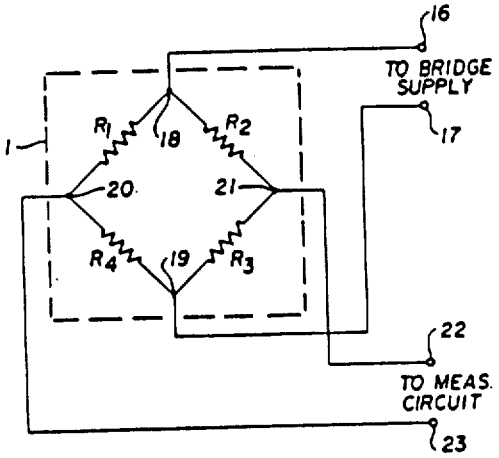
FIG.2 PRIOR ART
FIG. 2 is an electrical schematic diagram of a typical prior art bridge circuit of strain gauges located in the load cell mass comparator shown in FIG. 1.
Figure 3:
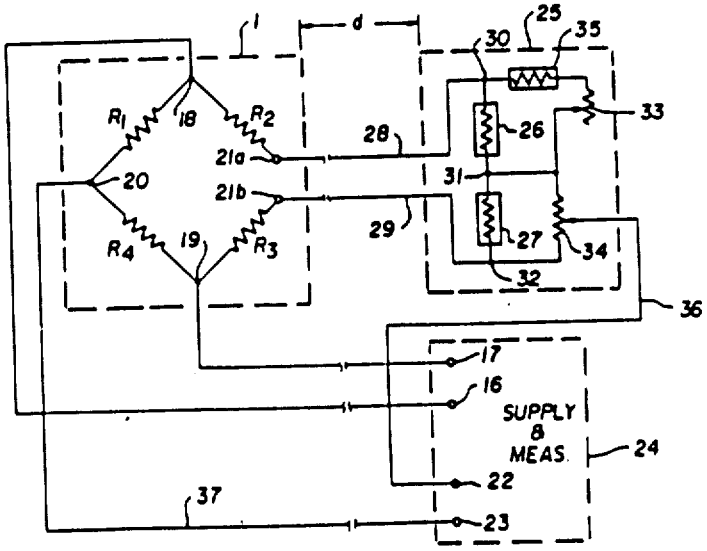
FIG. 3 is an electrical schematic diagram of the preferred embodiment of the subject invention.

In order to compensate for temperature changes experienced by the load cell 1 and the strain gauges included therein, reference is now made to FIG. 3 which discloses the preferred embodiment of the invention which comprises a modification to the bridge circuit shown in FIG. 2. Accordingly, an integrated strain gauge supply, measuring and recording instrument 24 is shown located remotely from the load cell mass comparator containing the load cell 1 by a distance d which may be, for example, 25 feet or more. The inventive concept is directed to an external resistive type compensation circuit connected into output junction 21 (FIG. 2) intermediate the output side of the strain gauges $R_2$ and $R_3$, which form two adjacent forms of the bridge. The compensating circuit 25, moreover, is preferably located remote from the strain gauge bridge, such as being located in close proximity to or incorporated with the measuring instrument 24 and thus being separated from the bridge by the distance d.

The temperature compensation circuit 25 is comprised of a pair of series connected precision resistors having fixed values of relatively low resistance in comparison to the resistance values of the strain gauge elements $R_1$, $R_2$, $R_3$ and $R_4$ but exhibiting low noise and low temperature drift characteristics. The precision resistors 26 and 27 are shown in FIG. 3 coupled between the terminals $21_a$ and $21_b$ by means of electrical connecting leads 28 and 29 which span the length d.

The addition of the two precision resistor elements 26 and 27 permit two additional points in the bridge to be accessed electrically, namely the circuit junctions 30, 31 and 32 instead of the single junction 21, as shown in FIG. 2. The compensating circuit 25 in addition to two series resistors 26 and 27, however, additionally includes circuit means which permits the bridge to be balanced during operation, i.e., when it is under strain because of an applied load. The balancing means comprises a pair of relatively high valued variable resistances in the form of potentiometers 31 and 34, respectively shunting the low valued precision resistors 26 and 27. One potentiometer, specifically potentiometer 33 additionally includes a series connected high valued precision resistor of fixed value so that the potentiometer 33 can be utilized as a means for fine balance, whereas the single potentiometer 34 coupled across the resistor 27 can be utilized to provide a coarse balance. The slider of the potentiometer 34, moreover, is coupled to an output lead 36 which couples to terminal 22 which is shown in FIG. 3 located on the measuring instrument 24 along with terminal 23 which connects back to the other output junction 20 of the bridge by circuit lead 37.

The values of the two potentiometers 33 and 34 as well as the third fixed resistor 35 are selected to be of a much greater resistance value than the pair of fixed resistors 26 and 27 so that the operation of the potentiometers 33 and 34 will not degrade the performance of the bridge and as a result can be nulled at any load within its capacity since there will always be a point between terminals $21_a$ and $21_b$ which will be at the same potential as the opposing output circuit junction 20.

In operation, the null appearing at output terminals 22 and 23 is first determined by weighing a standard mass. Then the mass to be calibrated is weighed. The strain gauge bridge which was previously nulled by using the standard mass will then indicate the difference between the weight to be calibrated and the standard weight. The temperature stability of the configuration as shown in FIG. 3 is significantly improved over the standard or conventional prior art method as shown in FIG. 2 because the additional precision resistors have a value which is small in relation to the resistance of the strain gauge elements $R_1$, $R_2$, $R_3$ and $R_4$ and are connected such that the symmetry of the bridge is preserved.

In the event that a fine adjustment of bridge balance is not required, the fine balance potentiometer 33 and the series connected fixed precision resistor 35 can be eliminated, leaving only the pair of low value precision resistors 26 and 27 connected between the terminals $21_a$ and $21_b$ and with but a single potentiometer such as potentiometer 34 shunting one of the precision resistors.

It is to be understood that the embodiment of the invention herewith shown and described is to be taken as a preferred example and being shown for purposes of illustration and not limitation. Accordingly, various changes, modifications, and alterations may be resorted to without departing from the spirit of the invention or scope of the subjoined claims.

I claim:

1. A temperature compensated load sensing circuit for a load cell mass comparator including a load cell containing a plurality of strain gauges connected to form arms of a bridge circuit connected to a measuring circuit, comprising the combination of:

a pair of series connected resistance means coupled between the output side of the strain gauges in a first of two adjacent arms of said bridge circuit, said resistance means being of a relatively low resistance value compared to the resistance value of said strain gauges;

potentiometer means shunted across at least one of said pair of series connected resistance means, said potentiometer means having a relatively large resistance value compared to the resistance value of said resistance means and further including an adjustable voltage output terminal; and means connecting said output terminal of said potentiometer means and the output side of the strain gauges in the second of two adjacent arms of said bridge circuit to said measuring circuit.

2. The load sensing circuit according to claim 1 wherein said pair of series connected resistance means comprises a first and second precision resistor.

3. The load sensing circuit according to claim 2 wherein said first and second precision resistors further exhibit a low noise and low temperature drift operating characteristic.

4. The load sensing circuit according to claim 3 wherein said first and second precision resistors and said potentiometer means are located remotely from said load cell.

5. The load sensing circuit according to claim 1 and including additional *bridge balancing* potentiometer means shunted across the other of said pair of series connected resistance means, said additional potentiometer means also having a relatively large resistance value compared to the resistance value of said resistance means.

6. The load sensing circuit according to claim 5 and further including resistance means coupled in series with said additional potentiometer means whereby the first recited said potentiometer means is operable to provide a coarse balance of said bridge and said additional potentiometer means is operable to provide a fine balance of said bridge.

7. The load sensing circuit according to claim 6 wherein said pair of series connected resistance means and said resistance means connected in series with said other potentiometer means are comprised of precision resistors.

8. The load sensing circuit according to claim 7 wherein said precision resistors are comprised of resistors having a low noise and low temperature drift characteristic.

9. The load sensing circuit according to claim 8 wherein said precision resistors and both said potentiometer means are located remotely from said load cell.

10. The load sensing circuit according to claim 9 wherein said remotely located precision resistors and potentiometer means are located in close proximity to said measuring circuit.

11. The load sensing circuit according to claim 9 wherein said remotely located precision resistors and potentiometer means are integrated with said measuring circuit.

12. The load sensing circuit according to claim 9 wherein said precision resistors are fixed value resistors.

*13. A circuit for providing temperature stabilization of a load cell containing a plurality of strain gauges connected to form arms of a bridge circuit connected to a measuring circuit, comprising the combination of:*

*a pair of series connected impedances coupled between the output side of the strain gauges in a first of two adjacent arms of said bridge circuit, said pair of impedances being of a relatively low impedance value compared to the impedance value of said strain gauges;*

*variable impedance means for balancing said bridge circuit shunted across at least one of said pair of series connected impedances, said variable impedance means having a relatively large impedance value compared to the impedance value of said pair of impedances and further including an adjustable voltage output terminal; and*

*means connecting said output terminal of said variable impedance means and the output side of the strain gauges in the second of two adjacent arms of said bridge circuit to said measuring circuit.*

*14. The circuit according to claim 13 wherein said pair of series connected impedances comprises a first and second precision resistor.*

*15. The circuit according to claim 14 wherein said first and second precision resistors further exhibit a low noise and low temperature drift operating characteristic.*

*16. The circuit according to claim 15 wherein said variable impedance means comprises potentiometer means and wherein said first and second precision resistors and said potentiometer means are located remotely from said load cell.*

*17. The circuit according to claim 13 and including additional variable impedance means for further balancing said bridge circuit shunted across the other of said pair of series connected impedances, said additional variable impedance means also having a relatively large impedance value compared to the impedance value of said impedances.*

*18. The load sensing circuit according to claim 17 and further including impedance means coupled in series with said additional variable impedance means whereby the first recited said variable impedance means is operable to provide a coarse balance of said bridge and said additional variable impedance means is operable to provide a fine balance of said bridge.*

*19. The circuit according to claim 18 wherein both said variable impedance means are comprised of potentiometer means and wherein said pair of series connected impedances and said impedance means connected in series with said other variable impedance means are comprised of precision resistors.*

*20. The circuit according to claim 19 wherein said precision resistors are comprised of resistors having a low noise and low temperature drift characteristic.*

*21. The circuit according to claim 20 wherein said precision resistors and both said potentiometer means are located remotely from said load cell.*

*22. The circuit according to claim 21 wherein said remotely located precision resistors and potentiometer means are located in close proximity to said measuring circuit.*

*23. The circuit according to claim 21 wherein said remotely located precision resistors and potentiometer means are integrated with said measuring circuit.*

*24. A circuit for providing temperature stabilization of a bridge circuit including a plurality of impedance means connected to form arms of a bridge circuit connected to a measuring circuit, comprising the combination of:*

*a pair of series connected impedances coupled between the output side of the impedance means in a first of two adjacent arms of said bridge circuit, said pair of impedances being of a relatively low impedance value compared to the impedance value of said impedance means;*

*variable impedance means for balancing said bridge circuit shunted across at least one of said pair of series connected impedances, said variable impedance means having a relatively large impedance value compared to the impedance value of said pair of impedances and further including an adjustable voltage output terminal; and*

*means connecting said output terminal of said variable impedance means and the output side of the impedance means in the second of two adjacent arms of said bridge circuit to said measuring circuit.*

*25. The circuit according to claim 24 wherein said bridge circuit comprises a load sensing circuit.*

*26. The circuit according to claim 24 wherein said bridge circuit comprises a load sensing circuit included in a load cell.*

*27. The circuit according to claim 24 wherein said plurality of impedance means comprises a plurality of strain gauges included in a load cell.*

• • • • •